US006856498B1

(12) United States Patent
Finlay, Sr.

(10) Patent No.: US 6,856,498 B1
(45) Date of Patent: Feb. 15, 2005

(54) GROUND FAULT CIRCUIT INTERRUPTER WITH INDICATOR LAMP AND PROTECTIVE CIRCUIT POWERED FROM HOT BUS BAR OF INTERRUPTING CONTACTS

(75) Inventor: David A. Finlay, Sr., Marietta, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 234 days.

(21) Appl. No.: 09/971,525

(22) Filed: Oct. 5, 2001

Related U.S. Application Data

(63) Continuation-in-part of application No. 09/718,003, filed on Nov. 21, 2000.

(51) Int. Cl.[7] .................................................. H02H 9/68

(52) U.S. Cl. ............................ 361/42; 361/43; 361/44; 361/45

(58) Field of Search ..................................... 361/42–45

(56) References Cited

U.S. PATENT DOCUMENTS 5,418,678 A * 5/1995 McDonald ................... 361/46
6,262,871 B1 * 7/2001 Nemir et al. ................. 361/42

* cited by examiner

*Primary Examiner*—Brian Sircus
*Assistant Examiner*—Boris Benenson
(74) *Attorney, Agent, or Firm*—Daniel P. Malley

(57) ABSTRACT

An AC power line protection device which includes a protection circuit which guards against miswiring also has an indicator lamp which lights when the device is in the tripped condition and turns off when the device is reset. If the device is miswired after having been wired properly, the indicator lamp does not light when the device is tripped, and so provides a supplemental indication of miswiring. The protection circuit is powered from the hot line bus bar. The indicator lamp is also powered via the hot line bus bar of the interrupting contacts to meet safety standards.

26 Claims, 5 Drawing Sheets

LINE (HOT)
LINE (NEUT)
250V MOV
J1
J2
R1
130
L1
41AWG
1000T
L2
41AWG
200T
S
F
R10
F
S
S1
R13
C4
C5
R8
D1
R3
R7
R6
R2
C1
R5
U1
1 2 3 4
8 7 6 5
C3
C6
C2
R9
C7
Q1
SCR
C8
R4
R14
100
140
R12
R11
502
110
120
504
LOAD (HOT)
LOAD (NEUT)
RECEPT. (HOT)
RECEPT. (NEUT)

LOAD (HOT)
LOAD (NEUT)
RECEPT. (HOT)
RECEPT. (NEUT)
120
504
502
R12
R11
110
140
R14
100

R4
Q1
SCR
C8
C7
R9
S1
L2
41AWG
200T
S
F
C4
D1
R8
C2
130
R1
L1
41AWG
1000T
F
S
R10
R13
R7
R6
C6
C1
R2
R5
R3
U1
C5
J2
J1
MOV
250V
C3
LINE (HOT)
LINE (NEUT)

LOAD (HOT)
LOAD (NEUT)
RECEPT. (HOT)
RECEPT. (NEUT)

R12
R11
110
1275T
36AWG
140
200
R4
C8
Q1
SCR
S1
140
C7
R9
130
41AWG
200T
L2
S
C4
C1
F
C2
D1
R8
R1
41AWG
1000T
R10
L1
F
R7
R6
C6
S
R13
R2
R5
U1
J2
J1
R3
MOV
250V
C5
C3
LINE (HOT)
LINE (NEUT)

GROUND FAULT CIRCUIT INTERRUPTER WITH INDICATOR LAMP AND PROTECTIVE CIRCUIT POWERED FROM HOT BUS BAR OF INTERRUPTING CONTACTS

CROSS-REFERENCE TO RELATED APPLICATIONS

This application is a continuation in part of U.S. application Ser. No. 09/718,003 filed Nov. 21, 2000, incorporated herein by reference.

FIELD OF THE INVENTION

This invention pertains to the field of ground fault circuit interrupter devices, and in particular, to a ground fault interrupter device with an indicator lamp and protective circuit powered from the hot bus bar of the interrupting contacts.

BACKGROUND OF THE INVENTION

Protective devices such as ground fault circuit interrupters (GFCIs) are well known in the art. Their intent is and always has been to protect the electrical power user from electrocution when hazardous ground fault currents are present.

Historical problems with these protective devices include the possibility of line/load miswiring in the field by an installer or the eventual failure of the solenoid driving device, typically a silicon controlled rectifier, which causes the interrupter device to become inoperable while electrical power is still present, even under hazardous ground fault conditions. A variety of methods are used to prevent or attempt to prevent miswiring with varying levels of success. Preventing the problems associated with a defective solenoid driving device is inherently more difficult. Labels and installation instruction sheets have been used to prevent miswiring, but can be ignored by the installer. Solenoid burn-out has been revealed by testing the protective device with a test button, but the result of the test can be ignored by the user.

SUMMARY OF THE INVENTION

Briefly stated, an AC power line protection device which includes a protection circuit which guards against miswiring also has an indicator lamp which lights when the device is in the tripped condition and turns off when the device is reset. If the device is miswired after having been wired properly, the indicator lamp does not light when the device is tripped, and so provides a supplemental indication of miswiring. The protection circuit is powered from the hot line bus bar. The indicator lamp is also powered via the hot line bus bar of the interrupting contacts to meet safety standards.

According to an embodiment of the invention, a protection device connected between hot and neutral conductors of an AC power line includes a protective circuit including a breaker coil operatively associated with a set of interrupting contacts; the interrupting contacts including a hot bus bar and a neutral bus bar; an indicator lamp circuit including an indicator lamp connected between the hot conductor on a line side of the interrupting contacts and the hot bus bar; and the protective circuit being powered from the hot bus bar.

According to an embodiment of the invention, a protection device connected between hot and neutral conductors of an AC power line includes protective means for protecting a load side of the AC power line against a ground fault; the protective means including a breaker coil operatively associated with a set of interrupting contacts, wherein the interrupting contacts include a hot bus bar; indicator means for indicating a specified condition of the protection device; the indicator means being connected between the hot conductor on a line side of the interrupting contacts and the hot bus bar; and the protective means is powered from the hot bus bar.

According to an embodiment of the invention, a method for protecting against miswiring a protection device connected between hot and neutral conductors of an AC power line, wherein the device includes an interrupter having two contacts on a hot bus bar connected respectively to line hot and load hot terminals and two contacts on a neutral bus bar connected respectively to line neutral and load neutral terminals, wherein the interrupter opens and closes to electrically disconnect and connect the load terminals, includes the steps of connecting a resistance between the hot conductor on a line side of the interrupter and the hot bus bar; and connecting an indicator in series wvith the resistance, wherein the indicator indicates if a power source is connected across the line hot and line neutral terminals while the contacts are open.

According to an embodiment of the invention, a method for protecting against miswiring a protection device includes the steps of (a) protecting a load side of the AC power line against a ground fault via the protection device; (b) operatively associating a breaker coil with a set of interrupting contacts inside the protection device, wherein the interrupting contacts include a hot bus bar; (c) indicating a specified condition of the protection device with an indicator; (d) connecting the indicator between the hot conductor on a line side of the interrupting contacts and the hot bus bar; and (e) powering the protective device from the hot bus bar.

DETAILED DESCRIPTION OF THE PREFERRED EMBODIMENT

Figure 1:
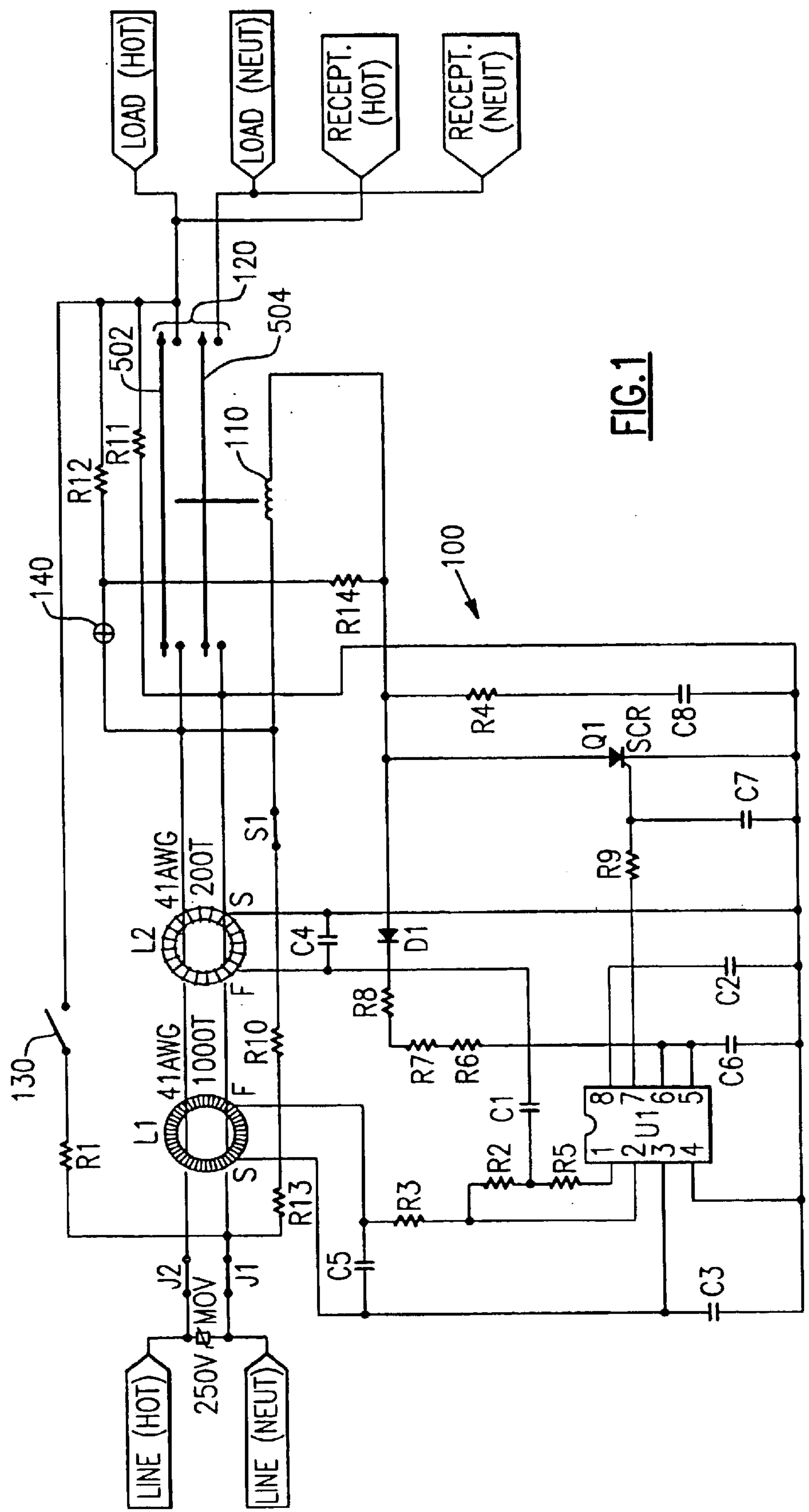
FIG. 1 shows a schematic of a GFCI circuit with miswire protection and an indicator lamp according to an embodiment of the invention.

Referring to FIG. 1, a GFCI circuit is shown generally at 100. When a differential transformer L1 senses unequal amounts of current flowing in the hot and neutral conductors due to a ground fault condition, circuit 100 causes a breaker coil 110 to activate, opening circuit interrupting mechanism 120. Circuit interrupting mechanism 120 conventionally includes hot and neutral bus bars 502, 504 that make and break contact with the hot and neutral power lines, respectively, via contacts located on both the bus bars and power lines at the four contact points. A test button 130 induces a simulated ground fault when pushed in and causes breaker coil 110 to activate.

This improved GFCI contains two unique features that address the problems noted in the background section. The first is a miswire circuit which uses a fault resistance R10, R13 creating a differential current on the primary of the differential current transformer L1 that exceeds the level of differential current that the GFCI has been designed to interrupt, typically 6 milliamperes. The fault resistance R10, R13 is on the line side of interrupting contacts 120 electrically located between the line and load terminals of the hot and neutral wire paths. The ground fault circuit sensing electronics of GFCI circuit 100 derives power from the line side terminals of the GFCI.

Should the GFCI be wired in a mode where power is supplied to the load terminals, i.e., miswired, if the GFCI is tripped, nothing visible happens. If the GFCI is in the reset condition, it will immediately trip when powered. In this mode, the current flowing through the fault resistance R10, R13, derived from the line terminal side of the device, is interrupted when the device trips. The estimated time it takes for the fault resistors R10, R13 to "clear" or burn out is greater than 50 ms and typically 300 ms. Because the trip time of the GFCI is less than or equal to 25 ms, fault resistors R10, R13 do not have enough time to clear. If one attempts to reset the device when in the miswired condition, the device immediately trips out again, and this continues until such time as the device is wired correctly, that is, when power is applied to the GFCI at the line terminals. This effectively results in a GFCI that will not operate, i.e., be able to be reset, until such time as the device is properly wired.

When electrical power is connected in a correct manner to the line terminals, a differential current is created by the fault resistance R10, R13 when power is applied to the device. If the device is reset before power is applied, the device trips as a result of this differential current. If the device is already in the tripped condition before power is applied, nothing visible happens. However, because the fault resistor is on the line side of the interrupting contacts 120, current through fault resistance R10, R13 continues to flow, regardless of interrupting contacts 120 being open. This internal differential current, created by the fault resistance R10, R13 clears itself in a short time, typically 300 ms. This can be accomplished by selecting a resistor or resistors whose power rating is greatly exceeded by the current, such that the resistor or resistors open. Another option is to provide a fuse (F1 in FIG. 3) in series with the fault resistance R10, R13 with a properly selected $I^2t$ rating so that the fuse blows instead of the fault resistance R10, R13. The term "resistive element" as used herein refers to either a resistance or a fuse. Once the device has been properly wired with power connected to the line terminals and the fault has been cleared, the device can be reset and provide its normal protective functions.

Two interesting issues with this miswire protection concept are how to perform the Underwriters Laboratories Standard 943 required tests during manufacturing of the protective device without the differential current produced by the fault resistor affecting the test results, or causing the fault resistor to clear in the manner previously described. A solution is to place a normally closed switch S1 in series with the fault resistance R10, R13 previously described as producing the differential current. This switch S1 is preferably a flexible conductive spring arm that normally rests against a contact on the top side of the printed circuit board. Directly below the spring arm of switch S1 is a hole in the printed circuit board, and below this hole is another hole in the plastic back body of the GFCI device. When the GFCI is loaded into a piece of test equipment designed to perform the required manufacturing tests, a mechanical test probe engages the spring arm of switch S1 through the two aforementioned holes, causing the spring arm of switch S1 to be pushed away from the contact and therefore opening the differential current circuit path. Manufacturing testing can now be performed without any circuit effect from this path, without burning out fault resistance R10, R13. The last test performed on the GFCI device in the test sequence is to disengage the probe from the spring arm of switch S1, which reconnects the differential current circuit path. Line voltage is then applied to the load contacts. The differential current causes the GFCI to trip, thereby checking the integrity of the differential current circuit path and components.

The second feature of this improved GFCI is a light with multiple indication meanings. The circuit in FIG. 1 includes resistors R11, R12, R14, and an indication device, shown on the schematic as neon light 140. The first function of light 140 is as a trip indicator. The light is off if the GFCI is in the reset condition, and illuminates if the GFCI trips. The second function of light 140 is to indicate miswiring. A third function of light 140 is to notify the user that the solenoid-driving device is defective and that the GFCI is no longer operational.

The indicating circuit works as follows. When the GFCI is wired properly, i.e., power from the supply source is connected to the line terminals and not the load terminals, and the device is reset, light 140 is off, as the line disconnecting contacts 120 are closed, resulting in no voltage across light 140 and resistor R12. If the GFCI trips for any reason, light 140 energizes as a result of line voltage being applied across light 140 and resistors R12 and R11. When the device is reset, voltage is removed and light 140 turns off. If the device is miswired for any reason, light 140 is off when the GFCI is reset, but when the device trips in this condition, there is no return path to neutral through resistor R11, and light 140 does not turn on as it would if the GFCI were wired properly. This feature is not dependent on the fault resistance R10, R13; therefore, if the miswire detection circuit has been previously used and the fault resistance cleared, miswire detection is still possible by exercising this light in conjunction with tripping out the GFCI.

Indicating a defective solenoid driving device, such as SCR Q1, is achieved with the addition of a resistor R14. With resistor R14 in the circuit, light 140 energizes when the SCR Q1 short circuits and a path to supply neutral develops. When this occurs, and the device is reset, the GFCI trips, energizing light 140 through resistor R14. Continuously applied line voltage to the solenoid occurring as a result of a shorted SCR Q1 causes the trip solenoid (coil 110) to open within a few seconds. Coil 110 burns out since it is continuously energized, so it cannot trip again after the device is reset. When the GFCI is reset in this condition, light 140 remains energized, indicating a defective solenoid driving device. The value of resistor R14 must be kept low relative to the value of resistor R12 as a voltage divider occurs between resistors R12 and R14 which limits the voltage across light 140. A neon lamp needs a minimum of about 60 volts to arc over and energize. A value of 33K for resistor R14 is suitable for this embodiment, which provides for about 66 volts across the neon lamp at a worst case line voltage of 102 VAC. Computing different values for resistors R11, R12, and R14 based on different types of lights 140 is considered within the capabilities of one skilled in the art.

Figure 2:
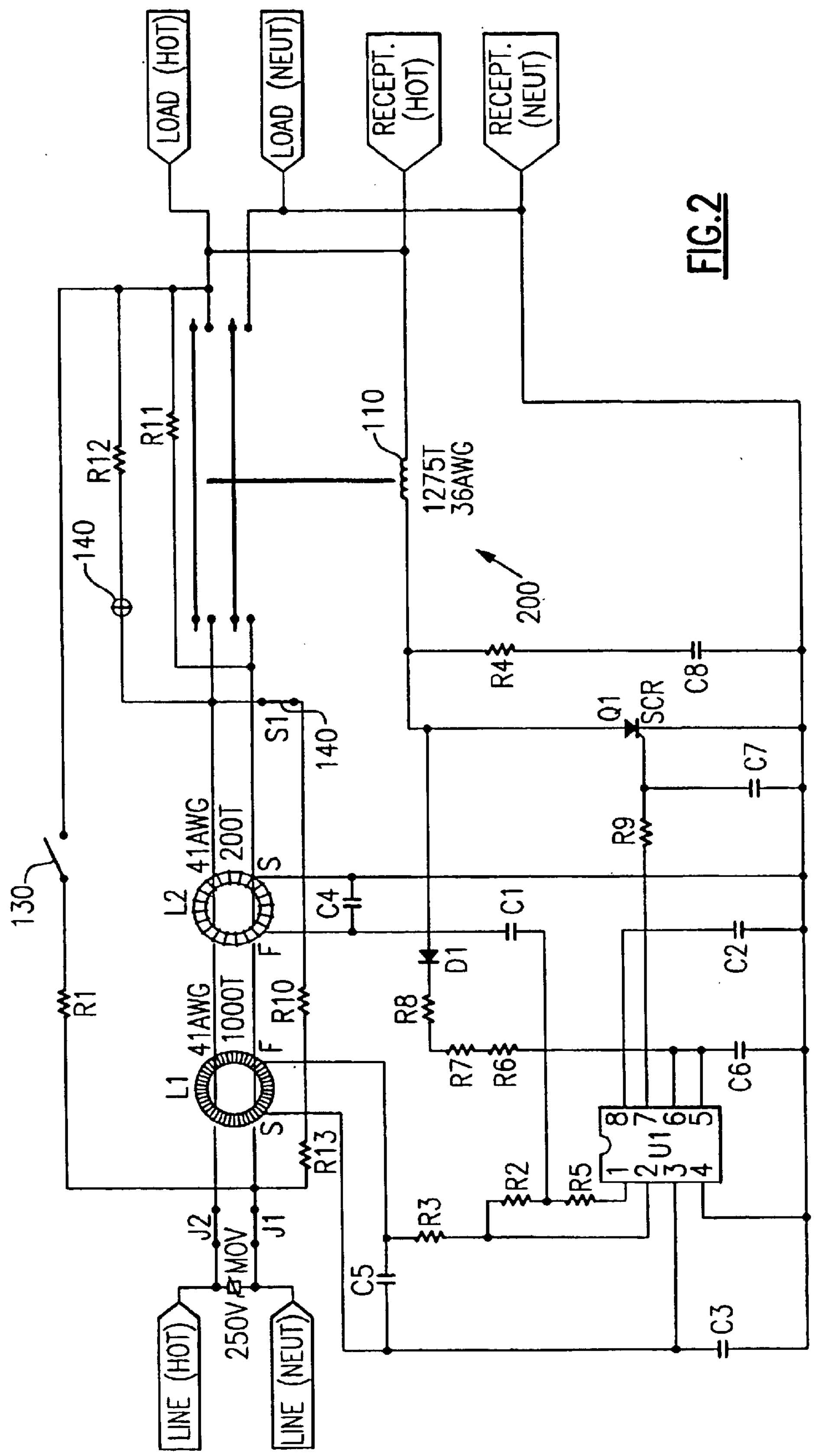
FIG. 2 shows a schematic of a lockout configuration according to an embodiment of the invention.

Referring to FIG. 2, an embodiment of the invention is shown at 200 in which the protection device cannot be reset if the SCR shorts out, i.e., the device is "locked out." This is because breaker coil 110 draws its power from the load sides of contacts 120 instead of the line side as in the embodiment of FIG. 1. When the SCR shorts out, breaker coil 110 immediately trips and opens contacts 120. Opening contacts 120 breaks the current to the load side of the device, so breaker coil 110 is de-energized, preventing it from burning out. When attempting to reset the device, breaker coil 110 immediately trips out contacts 120, thus preventing the device from being reset. Since the device cannot be reset, resistor R14 is not used in this embodiment because there is no need to indicate via light 140 that the device has a faulty SCR; the inability to reset the device signals that condition.

Figure 3:
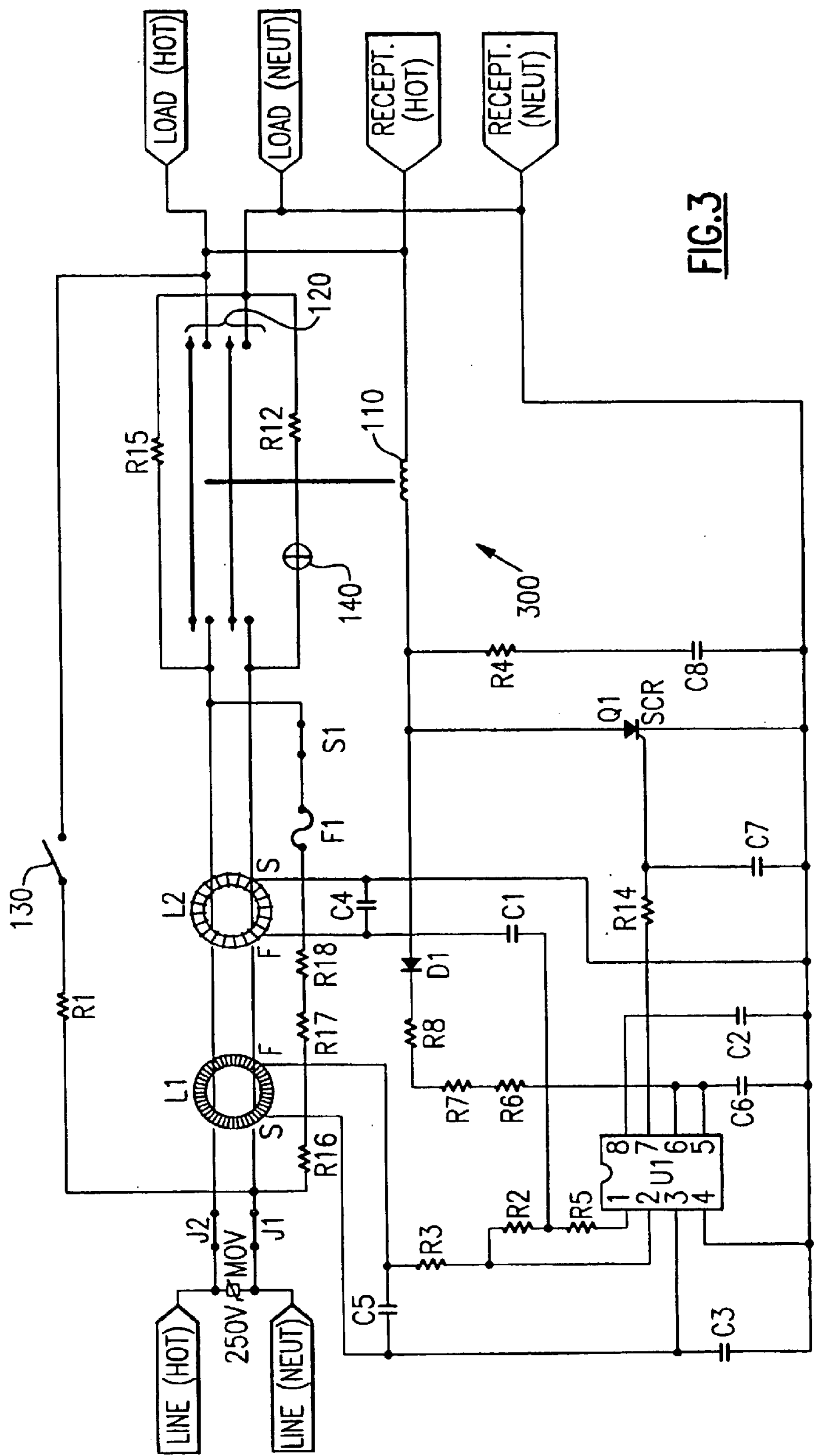
FIG. 3 shows a schematic of an alternative lockout configuration according to an embodiment of the invention.

Referring to FIG. 3, an alternative lock-out embodiment is shown at 300 which shows the series combination of light 140 and resistor R12 connected in parallel to the neutral conductor contact instead of the hot conductor contact as is the case in FIGS. 1 and 2. A resistor R15 completes the light circuit from load neutral to line hot. The miswire circuit fault resistance is shown here as resistors R16, R17, and R18 in series with fuse F1. This embodiment eliminates any trickle current that might be flowing if the device is miswired.

Figure 4:
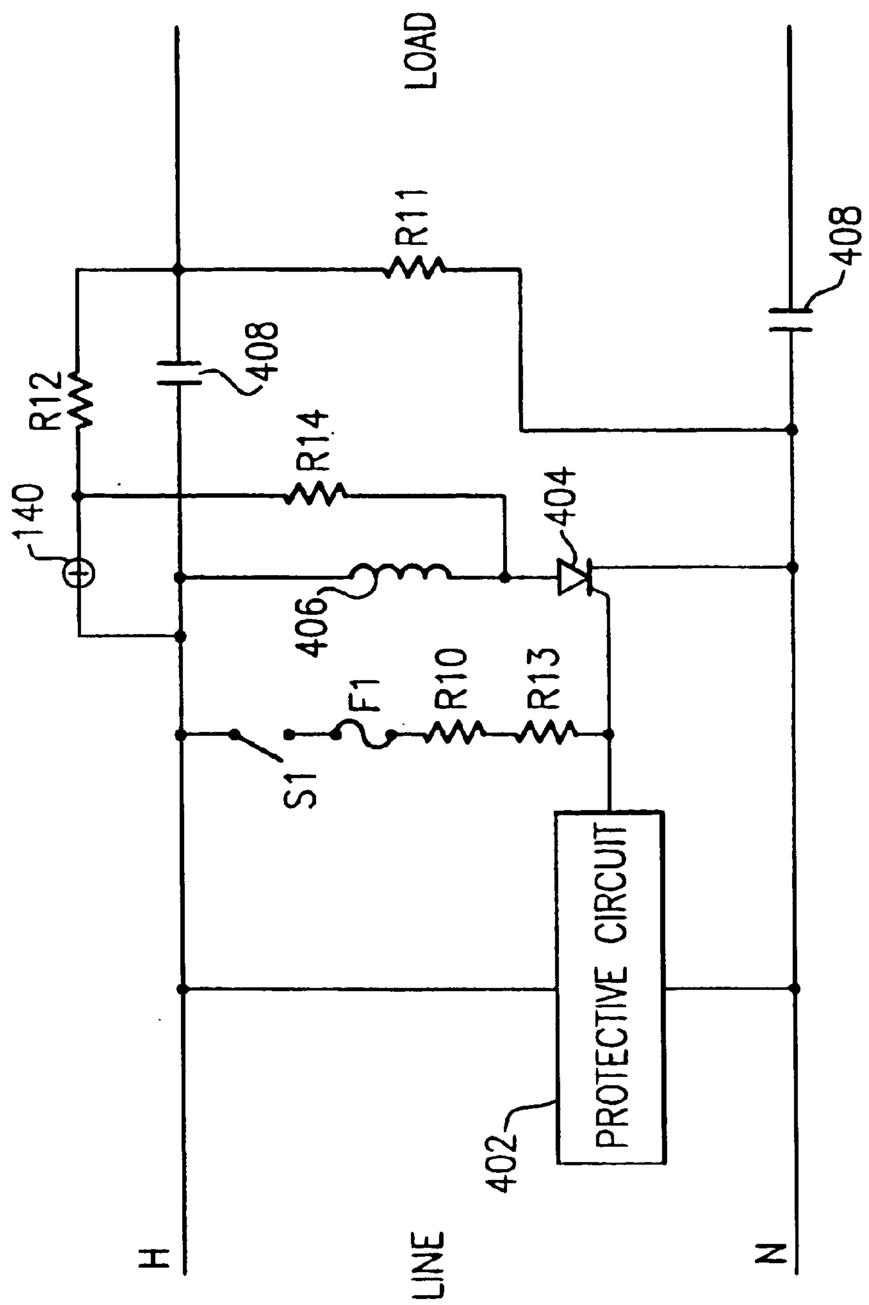
FIG. 4 shows a schematic of a protective circuit with miswire protection and an indicator lamp according to an embodiment of the invention.

Referring to FIG. 4, an embodiment of the invention is shown at 400 in which the protection device can be reset if the SCR shorts out. The embodiment is similar to the one shown in FIG. 1 except that it is generalized to apply to different protective devices such as ground fault circuit interrupters (GFCI's) or devices intended to interrupt ground faults from personnel contact with a power line conductor, arc fault circuit interrupters (AFCI's) intended to interrupt line current which if allowed to continue could cause an electrical fire, combination devices that provide both AFCI and GFCI protection, or the like.

According to this embodiment, the protective devices mentioned have a protective circuit 402 that detects the respective fault condition, turning on an electronic switching device such as SCR 404, energizing a solenoid 406 coil which receives power from the line conductors, to open interrupting contacts 408. Resistors R11, R12, R14, fault resistors R10, R13, normally closed switch S1, fuse F1, and light 140 have the same functions as previously described in the above embodiments. When power is miswired to the load terminals and the protective device is reset such that interrupting contacts 408 are closed, current flows through normally closed switch S1, fuse F1, fault resistors R10, R13 and the gate-cathode junction of SCR 404, energizing solenoid 406 and tripping the interrupting contacts 408. Fuse F1 and fault resistors R10, R13 are chosen to withstand the current flow for the time that power is applied to the load terminals to the moment when interrupting contacts 408 open, approximately 25 milliseconds. If line power is connected as intended to the line terminals of the protective device, current flows through normally closed switch S1, fuse F1, fault resistors R10, R13, and the gate cathode junction of SCR 404 until such time as fuse F1 clears, after which it is possible to accomplish a resetting of the interrupting contacts 408. Solenoid 406 is designed not to burn out during the interval that SCR 404 is conductive, which interval is designed to be approximately 100 milliseconds. In this manner the protective functions described in FIG. 1 are provided without necessarily requiring a differential current transformer L1 in the construction of the protective device nor attachment of the fault resistor and fuse circuit to both the hot and neutral line conductors. If an electronic switching device other than an SCR is used, e.g., a bipolar transistor, the connections shown here as being made to the gate of the SCR would instead be made to the base of the bipolar transistor. "Gate" and "base" are intended to have an equivalent meaning in this specification and claims.

There are several problems with the above embodiments from a regulatory and safety viewpoint. For example, there is a high voltage dielectric test requirement in the present UL Standard. This test is performed by applying a high voltage potential between line hot and load hot (and again between line neutral and load neutral) with the GFCI in the tripped condition. The light indication circuit connection between line and load hot in the previous embodiments would cause this test to fail. Another problem is that the circuit is subject to a maximum "leakage" current of 0.5 ma. This maximum allowable current is not sufficient to drive an LED to achieve the desired light output in the indicator light. A further problem is that the mechanical embodiment of the GFCI is subjected to a reset button "tease" test if the circuit power is derived from the load side contacts. The test is performed by placing an ohmmeter across each set of contacts and then slowly releasing the reset button during the reset sequence to see if there is a point at which one contact closes while the other remains open. The required mechanical structure to pass the tease test must be kept in mind when designing the electrical circuit portion of the protection device. These problems are solved by the next embodiment.

Figure 5:
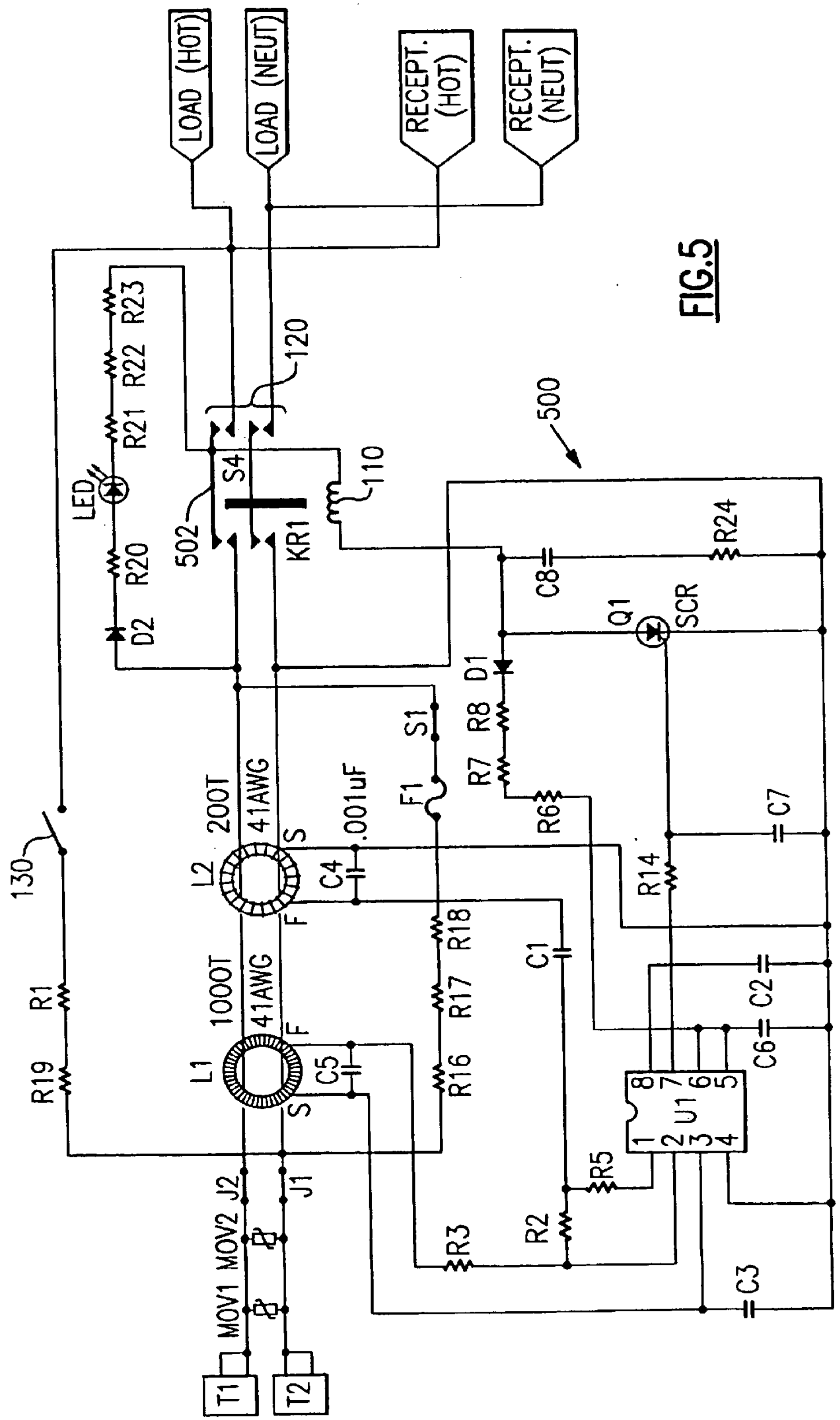
FIG. 5 shows a schematic of a protective circuit with miswire protection and an indicator lamp according to an embodiment of the invention.

Referring to FIG. 5, a circuit 500 is shown in which circuit power is derived from hot bus bar 502 of the tripping mechanism. Circuit 500 still meets the original circuit requirements of removing power to the SCR when the SCR shorts. When power is applied and the GFCI is in the reset condition, bus bar 502 is in contact with the line hot, so the circuit is powered. When a ground fault is sensed by differential transformer L1, the GFCI device of this embodiment trips normally.

Another function of the original circuit was to have an indicator light that came on as a result of the GFCI tripping when the GFCI was correctly wired, but when the GFCI was miswired by bringing power to the load contacts, the indicator light would not energize when the GFCI was tripped. The indicator circuit of this embodiment includes a diode D2 in series with resistors R20, R21, R22, and R23, and an LED. When the properly wired GFCI trips and the SCR is not shorted out, bus bar 502 which provides power to circuit 500 is removed from contact with line hot. Current then flows through the indicator circuit, coil 110, diode D1, and resistors R6, R7, R8 to provide the power to illuminate the LED. Nominal current through the LED is about 4 ma.

The indicator circuit works in conjunction with the GFCI sense circuitry to power the indicator and to protect coil 110 in the event that the SCR shorts out. When the properly wired GFCI trips due to the SCR shorting, current still flows through the indicator circuit, coil 110, and then through the shorted SCR. Nominal current in this scenario is about 10 ma. Coil 110 is protected from burning out by the resistor chain R20, R21, R22, and R23. Diode D1 serves to half wave rectify the voltage for circuit 500, protects the LED from breaking over in the reverse direction when the GFCI is tripped, and halves the power across resistor chain R20, R21, R22, and R23 when the SCR shorts out.

When the GFCI is miswired, i.e., when the power is applied to the load terminals of the device instead of the line terminals of the device, the LED cannot light because there is no path for the current to take when the device is tripped. Thus, if the device is tripped and no light appears, the installer knows that the device is miswired.

Although the invention is described with respect to a GFCI, the invention is equally applicable to an AFCI or indeed to any circuit interrupting device.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A protection device connected between hot and neutral conductors of an AC power line, comprising:

a protective circuit including a breaker coil operatively associated with a set of interrupting contacts, wherein said interrupting contacts include a hot bus bar;

an indicator lamp circuit including an indicator lamp connected between said hot conductor on a line side of said interrupting contacts and said hot bus bar; and said protective circuit is powered from said hot bus bar.

2. A protection device according to claim 1, wherein, when said protection device is properly wired to said AC power line, said indicator lamp lights when said interrupting contacts are opened by said protection device and said indicator lamp goes out when said protection device is reset and said interrupting contacts close.

3. A protection device according to claim 2, wherein said indicator lamp does not light when said interrupting contacts are opened by said protection device if said protection device is miswired even after having been properly wired to said AC power line.

4. A protection device according to claim 3, further comprising:

a switch element in said protective circuit connected to one end of said breaker coil; and another end of said breaker coil connected to said hot bus bar.

5. A protection device according to claim 4, wherein said indicator lamp lights if said switch element in said protection device is shorted.

6. A protection device according to claim 1, wherein said indicator lamp circuit includes said indicator lamp connected in series with a resistance and a diode.

7. A protection device according to claim 1, wherein said indicator lamp does not light when said interrupting contacts are opened by said protection device if said protection device is miswired even after having been properly wired to said AC power line.

8. A protection device according to claim 1, further comprising:

a switch element in said protective circuit connected to one end of said breaker coil; and another end of said breaker coil connected to said hot bus bar.

9. A protection device according to claim 8, wherein said indicator lamp lights if said switch element in said protection device is shorted.

10. A protection device according to claim 8, wherein said interrupting contacts open if said switch element in said protection device is shorted while either said line side or a load side of said protection device is connected to AC power.

11. A protection device according to claim 8, wherein, when said breaker coil fails by creating an open circuit, said indicator lamp fails to illuminate under all conditions.

12. A protection device according to claim 1, further comprising at least one resistive element connected at one end to a line hot side of said protection device and connected at another end to a line neutral side of said protection device, such that connecting AC power to a load side of said protection device causes said interrupting contacts to open, and connecting AC power to a line side of said protective device permanently clears said at least one resistive element.

13. A protection device connected between hot and neutral conductors of an AC power line, comprising:

protective means for protecting a load side of said AC power line against a ground fault;

said protective means including a breaker coil operatively associated with a set of interrupting contacts, wherein said interrupting contacts include a hot bus bar;

indicator means for indicating a specified condition of said protection device;

said indicator means being connected between said hot conductor on a line side of said interrupting contacts and said hot bus bar; and said protective means is powered from said hot bus bar.

14. A protection device according to claim 13, wherein said indicator means includes audible means for indicating said specified condition with a signal audible to a human.

15. A protection device according to claim 13, wherein said indicator means includes illumination means for indicating said specified condition with a signal visible to a human.

16. A protection device according to claim 13, further comprising:

first circuit means for preventing interrupting contacts in said protection device from closing when a load side of said protection device is improperly connected to a source of AC power; and second circuit means for permitting said interrupting contacts to close when a line side of said protection device is properly connected to said source of AC power.

17. A method for protecting against miswiring a protection device connected between hot and neutral conductors of an AC power line, wherein said device includes an interrupter having two contacts on a hot bus bar connected respectively to line hot and load hot terminals and two contacts on a neutral bus bar connected respectively to line neutral and load neutral terminals, wherein said interrupter opens and closes to electrically disconnect and connect said load terminals, respectively, comprising the steps of:

operatively associating a breaker coil of a protective circuit with said interrupter;

connecting an indicator lamp circuit between said hot conductor on a line side of said interrupter and said hot bus bar; and powering said protective circuit from said hot bus bar.

18. A method according to claim 17, further comprising the steps of:

lighting said indicator lamp when said protection device is properly wired to said AC power line and said interrupting contacts are opened by said protection device; and extinguishing said indicator lamp when said protection device is properly wired to said AC power line, said protection device is reset, and said interrupting contacts close.

19. A method according to claim 18, further comprising the step of not lighting said indicator lamp when said interrupting contacts are opened by said protection device if said protection device is miswired even after having been properly wired to said AC power line.

20. A method according to claim 19, further comprising the step of connecting a switch element in said protective circuit to one end of said breaker coil, and another end of said breaker coil to said hot bus bar.

21. A method according to claim 20, further comprising the step of lighting said indicator lamp if said switch element in said protection device is shorted.

22. A method according to claim 17, further comprising the step of connecting at least one resistive element at one end to a line hot side of said protection device and connecting at another end to a line neutral side of said protection device, such that connecting AC power to a load side of said protection device causes said interrupting contacts to open, and connecting AC power to a line side of said protective device permanently clears said at least one resistive element.

23. A method for protecting against miswiring a protection device, comprising the steps of:

protecting a load side of said AC power line against a ground fault via said protection device;

operatively associating a breaker coil with a set of interrupting contacts inside said protection device, wherein said interrupting contacts include a hot bus bar;

indicating a specified condition of said protection device with an indicator;

connecting said indicator between said hot conductor on a line side of said interrupting contacts and said hot bus bar; and powering said protective device from said hot bus bar.

24. A method according to claim 23, wherein said step of indicating includes indicating said specified condition with a signal audible to a human.

25. A method according to claim 24, wherein said step of indicating includes indicating said specified condition with a signal visible to a human.

26. A method according to claim 23, further comprising the steps of:

preventing said interrupting contacts in said protection device from remaining closed when a load side of said protection device is improperly connected to a source of AC power; and permitting said interrupting contacts to remain closed when a line side of said protection device is properly connected to said source of AC power.

* * * * *